(12) United States Patent
Zambo et al.

(10) Patent No.: US 7,312,691 B2
(45) Date of Patent: Dec. 25, 2007

(54) SYSTEM AND METHOD OF USING TELEMATICS UNITS FOR LOCKING AND UNLOCKING VEHICLE FUNCTIONS

(75) Inventors: Michael G. Zambo, Warren, MI (US); Christopher L. Oesterling, Troy, MI (US); George A. Economos, Sterling Heights, MI (US); Steven J. Ross, Livonia, MI (US)

(73) Assignee: General Motors Corporation, Detroit, MI (US)

( * ) Notice: Subject to any disclaimer, the term of this patent is extended or adjusted under 35 U.S.C. 154(b) by 472 days.

(21) Appl. No.: 11/079,707

(22) Filed: Mar. 14, 2005

(65) Prior Publication Data

US 2006/0202799 A1 Sep. 14, 2006

(51) Int. Cl.
*G05B 19/00* (2006.01)
(52) U.S. Cl. .................................... 340/5.72; 340/5.21
(58) Field of Classification Search ............... 340/5.72, 340/825; 701/33
See application file for complete search history.

(56) References Cited

U.S. PATENT DOCUMENTS

| 5,970,390 | A | 10/1999 | Koga et al. |
|---|---|---|---|
| 6,493,546 | B2 | 12/2002 | Patsiokas |
| 6,950,638 | B2 | 9/2005 | Videtich et al. |
| 6,978,152 | B1 | 12/2005 | Yamaashi et al. |
| 2001/0037210 | A1 | 11/2001 | Hirayama |
| 2001/0037378 | A1 | 11/2001 | Hirayama |
| 2003/0194977 | A1 | 10/2003 | Videtich et al. |
| 2003/0203714 | A1 | 10/2003 | Videtich et al. |
| 2003/0236075 | A1 | 12/2003 | Johnson et al. |
| 2004/0121748 | A1 | 6/2004 | Glaza |
| 2004/0142659 | A1 | 7/2004 | Oesterling et al. |
| 2004/0192404 | A1 | 9/2004 | Zenios et al. |
| 2005/0049002 | A1 | 3/2005 | White et al. |
| 2005/0136902 | A1 | 6/2005 | Mazzara |
| 2006/0040609 | A1 | 2/2006 | Petschke et al. |
| 2006/0046649 | A1 | 3/2006 | Videtich |
| 2006/0057956 | A1 | 3/2006 | Grau et al. |

*Primary Examiner*—Jeffery Hofsass
*Assistant Examiner*—Nabil Syed

(57) ABSTRACT

A method for remotely locking or unlocking vehicle functions including receiving a lock request at a vehicle telematics unit, modifying a vehicle identification number based on the request and locking or unlocking at least one vehicle function based on the modified vehicle identification number and the lock request.

20 Claims, 4 Drawing Sheets

SYSTEM AND METHOD OF USING TELEMATICS UNITS FOR LOCKING AND UNLOCKING VEHICLE FUNCTIONS

FIELD OF THE INVENTION

This invention relates to locking and unlocking vehicle functions.

BACKGROUND OF THE INVENTION

The opportunity to personalize features in a mobile vehicle is ever increasing as the automobile is being transformed into a communications and entertainment platform as well as a transportation platform. Many new cars will be installed with some type of telematics unit to provide wireless communication and location-based services. These services may be accessed through interfaces such as voice-recognition computer applications, touch-screen computer displays, computer keyboards, or a series of buttons on the dashboard or console of a vehicle.

For example, a theft deterrent system for radios in vehicles is currently embedded in many base level radios and premium level radios with enhanced capabilities. The theft deterrent system includes an electrical communication from a vehicle master control module to the radio upon power-up of the vehicle. The electrical communication is used to verify that a vehicle identification number (VIN) embedded in the radio matches the vehicle identification number in the master control module. In many cases, the master control module is the vehicle body control module. Typically, the electrical communication is configured with a communication protocol over a vehicle serial communication bus such as J1850, CAN (Controller Area Network), MOST (Media Oriented System Transport), LIN (Local Interconnect Network), or Ethernet, among others.

If there is a mismatch between the VIN in the master control module and the radio, a diagnostic trouble code is set, the radio is locked and a message is displayed on the radio to indicate that the radio is locked. When the radio is locked, radio functions are disabled, such as responses to radio control pushbutton presses. Additionally, multimedia and infotainment functions, such as integrated cassette players, CD, DVD, display, and navigation functions are disabled. If a radio is moved from one car to another, as occurs when a radio is stolen from one vehicle and placed in another vehicle, the radio will not function in the new vehicle. Also, if the radio is programmed with the incorrect VIN, the radio in the vehicle will lock upon the vehicle ignition.

In order to unlock the locked radio, the user must take the radio to a vehicle dealership and prove ownership of the vehicle and the radio. The vehicle dealership then plugs a service tool into the data link connection to access the serial communication bus. The service tool transmits commands to the radio to reprogram the correct vehicle identification number into the radio. Upon the next ignition cycle, the VIN in the radio matches the vehicle identification number in the vehicle master control module and the radio unlocks.

In some cases, a user desires to lock and later unlock one or more vehicle functions. For example, user may desire to lock the vehicle ignition module when the user leaves the vehicle unattended for an extended period of time, in order to make it difficult for a thief to steal the vehicle.

It is desirable to provide a method and system to lock and unlock vehicle functions of various modules in a vehicle from a telematics unit in the vehicle.

SUMMARY OF THE INVENTION

One aspect of the present invention provides a method for remotely locking or unlocking vehicle functions including receiving a lock request at a vehicle telematics unit, modifying a vehicle identification number based on the request and locking or unlocking at least one vehicle function based on the modified vehicle identification number and the lock request.

A second aspect of the present invention provides computer readable medium storing a computer program including computer readable code operable to receive a lock request at a vehicle telematics unit, to modify a vehicle identification number based on the request and to lock or unlock at least one vehicle function based on the modified vehicle identification number and the lock request.

A third aspect of the present invention provides a system for remotely locking or unlocking vehicle functions including means for receiving a lock request at a vehicle telematics unit, means for modifying a vehicle identification number based on the request, and means for locking or unlocking at least one vehicle function based on the modified vehicle identification number and the lock request.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

Various embodiments of the present invention are illustrated by the accompanying figures, wherein.

DETAILED DESCRIPTION OF THE PRESENTLY PREFERRED EMBODIMENTS

Figure 1:
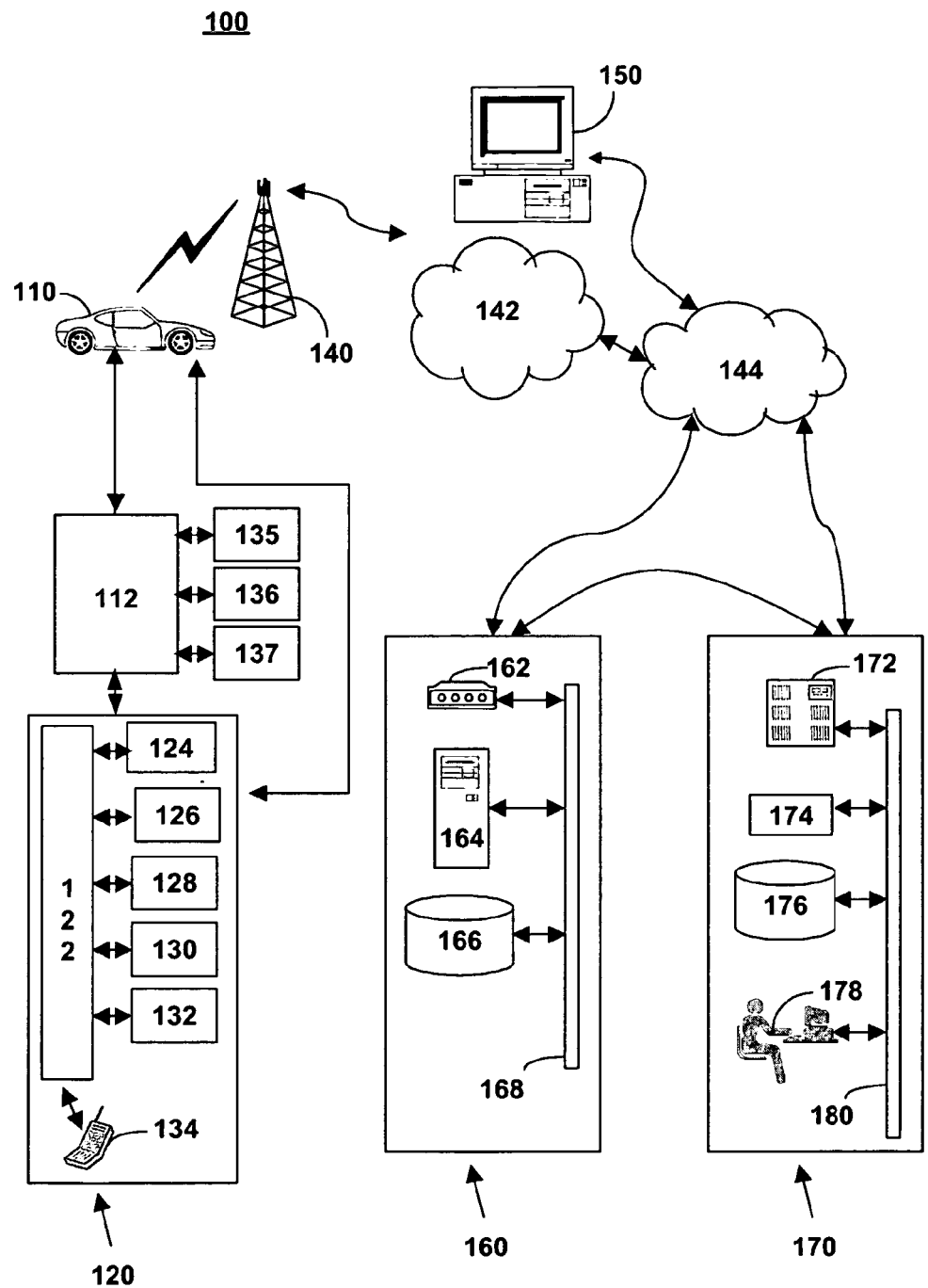
FIG. 1 is a schematic diagram of a system for providing access to a telematics system in a mobile vehicle.

FIG. 1 illustrates one embodiment of system for data transmission over a wireless communication system, in accordance with the present invention at 100. Mobile vehicle communication system (MVCS) 100 includes a mobile vehicle communication unit (MVCU) 110, a vehicle communication network 112, a telematics unit 120, one or more wireless carrier systems 140, one or more communication networks 142, one or more land networks 144, one or more client, personal or user computers 150, one or more web-hosting portals 160, and/or one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 may also be referred to as a mobile vehicle throughout the discussion below. In operation, MVCU 110 may be implemented as a motor vehicle, a marine vehicle, or as an aircraft. MVCU 110 may include additional components not relevant to the present discussion.

Vehicle communication network 112 sends signals between various units of equipment and systems (detailed below) within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications, MOST (Media Oriented System Transport), LIN (Local Interconnect Network), or Ethernet, among others.

MVCU 110, via telematics unit 120, sends and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, and an in-vehicle mobile phone 134. In other embodiments, telematics unit 120 may be implemented without one or more of the above listed components, such as, for example, a microphone 130 or speakers 132. Telematics unit 120 may include additional components not relevant to the present discussion.

Processor 122 is implemented as a microcontroller, microprocessor, controller, host processor, or vehicle communications processor. In one embodiment, processor 122 is a digital signal processor (DSP). In an example, processor 122 is implemented as an application specific integrated circuit (ASIC). In another embodiment, processor 122 is implemented as a processor working in conjunction with a central processing unit (CPU) performing the function of a general purpose processor. GPS unit 126 provides longitude and latitude coordinates of the vehicle and UTC (Coordinated Universal Time) responsive to a GPS broadcast signal received from one or more GPS satellite broadcast systems (not shown). In-vehicle mobile phone 134 is a cellular-type communication device, such as, for example, an analog, digital, dual-mode, dual-band, multi-mode or multi-band cellular phone.

Processor 122 executes various computer programs that control programming and operational modes of electronic and mechanical systems within MVCU 110. Processor 122 controls communications (e.g. call signals) between telematics unit 120, wireless carrier system 140, and call center 170. In one embodiment, a voice-recognition application is installed in processor 122 that can translate human voice input through microphone 130 to digital signals.

Processor 122 generates and accepts digital signals that are transmitted between telematics unit 120 and various electronic modules 135, 136 and 137 via a vehicle communication network 112. In one embodiment, these digital signals activate the programming mode and operation modes, as well as provide for data transfers. Some electronic modules include the Body Control Module, Powertrain Control Module (PCM), Antilock brakes system (ABS), Instrument Panel Cluster (IPC), the vehicle ignition module, a remote start key fob and the radio module, wherein the radio module may contain multimedia and infotainment components, such as, for example, a cassette tape, CD, DVD, a hard drive, streaming audio or streaming visual players.

The vehicle identification number of the MVCU 110 may be embedded in the telematics unit 120 and/or the electronic modules 135, 136 and 137 at the factory, which manufactured the MVCU 110. Typically one module is designated as a master control module with respect to containing a vehicle identification number that is used as a reference VIN for other modules in the vehicle. In one embodiment, the master control module may be a body control module. In another embodiment, the master control module may be a powertrain control module. In other embodiments, the master control module may be any electronic module designated by a vehicle manufacturer, in any make, model, or vehicle line.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal or user computer 150 includes a computer usable medium to execute Internet browser and Internet-access computer programs for sending and receiving data over land network 144 and optionally, wired or wireless communication networks 142 to web-hosting portal 160. Personal or client computer 150 sends user preferences to web-hosting portal through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110. In operation, a client utilizes computer 150 to initiate setting or re-setting of user-preferences for MVCU 110. User-preference data from client-side software is transmitted to server-side software of web-hosting portal 160. User-preference data is stored at web-hosting portal 160.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station pre-set selections, climate controls, custom button configurations and theft alarm settings. For each client, the web server potentially stores hundreds of preferences for wireless vehicle communication, networking, maintenance and diagnostic services for a mobile vehicle.

In one embodiment, one or more web servers 164 are networked via network system 168 to distribute user-preference data among its network components such as database 166. In an example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and/or land network 144. Switch 172 receives data transmissions from and sends data transmissions to one or more web-hosting portals 160. Switch 172 receives data transmissions from or sends data transmissions to one or more communication services managers 174 via one or more network systems 180. Communication manager 178 may contain one or more digital and/or analog data modems (not shown).

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services, including enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data to telematics unit 120 in MVCU 110 through wireless carrier system 140, communication network 142, land network 144, voice and data switch 172, and/or network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g. a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110.

Communication services advisor 178 provides services to telematics unit 120 in MVCU 110. Services provided by communication services advisor 178 include enrollment services, navigation assistance, real-time traffic advisories, directory assistance, roadside assistance, business or residential assistance, information services assistance, emergency assistance, and communications assistance. Communication services advisor 178 communicate with telematics unit 120 in MVCU 110 through wireless carrier system 140, communication network 142, and land network 144 using voice transmissions, or through communication services manager 174 and switch 172 using data transmissions. Switch 172 selects between voice transmissions and data transmissions.

Figure 2:
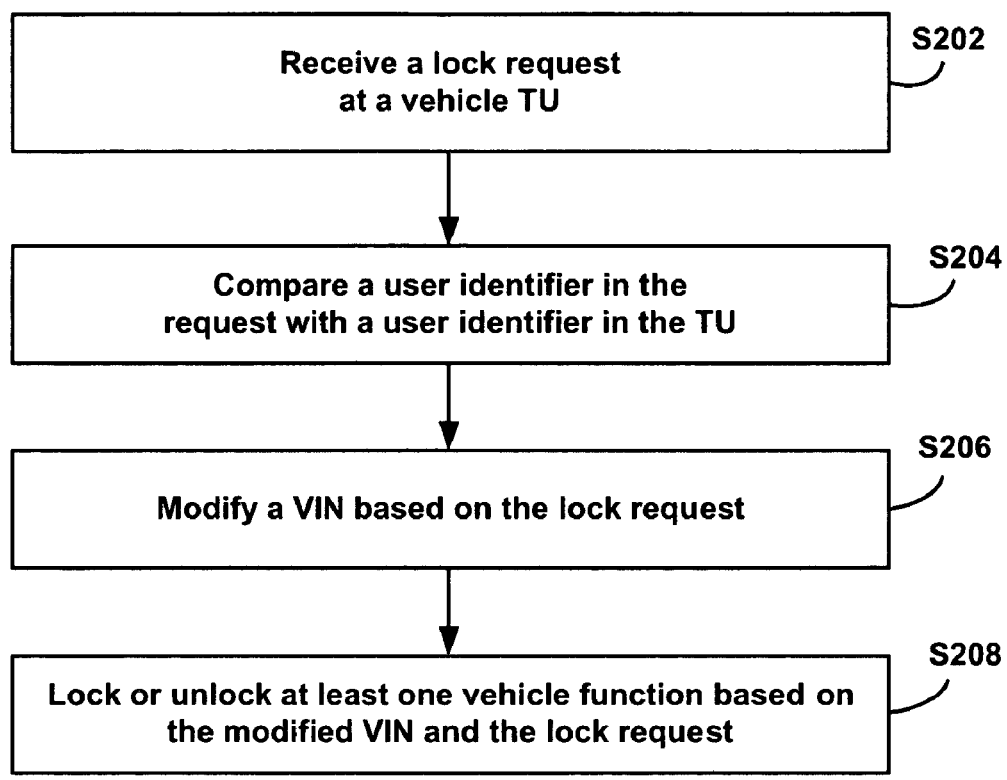
FIG. 2 illustrates a method for remotely locking or unlocking vehicle functions in accordance with the present invention.

FIG. 2 illustrates a method 200 for remotely locking or unlocking vehicle functions in accordance with the present invention. The telematics unit 120, the processor 122, in-vehicle memory 128, the key fob (not shown), and the electronic modules 135, 136 and 137 have stored in computer readable medium at least one computer program including computer readable code to perform the operations described with reference to method 200. The vehicle functions include operation of a radio in the MVCU 110, operation of the lights, horn, and/or windows of the MVCU 110, operation of the remote start key fob associated with the MVCU 110 and power-up of the MVCU 110. The key fob associated with key to power-up the MVCU 110 has an embedded processor to transmit wireless signals responsive to button pushes on the key fob and ignition cycling by the key fob. An ignition cycle occurs when a user inserts the key in the MVCU 110 and rotates the key to power-up the MVCU 110.

During stage S202, the telematics unit (TU) 120 in the MVCU 110 receives a lock request. The lock request is one of a request to lock an electronic module 135, 136 or 137 or unlock the electronic module 135, 136 or 137. The electronic module 135, 136 or 137 may be, for example, from the group consisting of a powertrain control module, an engine control module, a body control module, a radio, an entertainment unit module, an antilock brakes system, an instrument panel cluster, the vehicle ignition module, a remote start key fob, and combinations thereof.

The lock request includes a user identifier. The user identifier includes one or more of a customer number associated with the MVCU 110. The user identifier may be, for example, a social security number, a password, a security code and/or a personal identification number. The user identifier is used to verify that an authorized user is making the lock request.

The user of the MVCU 110 initiates the lock request by a button push on the telematics unit 120. In this embodiment, the processor 120 retrieves the user identifier from the in-vehicle memory 128 responsive to the button push.

In one embodiment, the user speaks with a communication services advisor 178 at the call center 170 to initiate the lock request. In this embodiment, a wireless connection is established over one or more wireless carrier systems 140, one or more communication networks 142, one or more land networks 144, one or more web-hosting portals 160, and/or one or more call centers 170. The user identifier is embedded in one or more data packet headers transmitted from the telematics unit 120 to the call center 170 to initiate the wireless connection. Based on the verbal lock request, the communication services advisor 178 transmits the lock request to the telematics unit 120 over the open communication channel. In one embodiment, the communication services advisor 178 asks the user to state a second user identifier associated with the data packet header.

In another embodiment, the user enters a series of keystrokes into a keypad at the telematics unit 120 to initiate the lock request. In this embodiment, the processor 120 retrieves the user identifier from the in-vehicle memory 128 responsive to the entered keystrokes. In one embodiment, the keystrokes include a user identifier.

In yet another embodiment, the user enters a series of keystrokes into a keyboard at a personal or user computer 150 to initiate the lock request. In this embodiment, the series of keystrokes includes the user identifier, as well as the lock request and the vehicle function to be locked or unlocked. The request is transmitted from the personal or user computer 150 to the telematics unit 120 over one or more wireless carrier systems 140, one or more communication networks 142, one or more land networks 144, one or more client, personal or user computers 150, one or more web-hosting portals 160, and/or one or more call centers 170.

During stage S204, the telematics unit 120 compares a user identifier in the request with a user identifier stored in the in-vehicle memory 128 of the telematics unit 120. The processor retrieves the user identifier stored in the in-vehicle memory 128 and applies an algorithm to compare the retrieved user identifier with the user identifier included with the lock request.

During stage S206, the telematics unit 120 modifies a vehicle identification number (VIN) embedded in the one or more of the electronic modules 135, 136 and 137 based on the lock request. The vehicle identification number of the MVCU 110 is embedded in the electronic modules 135, 136 and 137 and the telematics unit 120 at the factory where the MVCU 110 was manufactured.

The telematics unit 120 is configured to request the vehicle identification number from the electronic modules 135, 136 and 137 when the MVCU 110 is powered-up by an ignition cycle. During power up, the telematics unit 120 applies an algorithm to retrieve the VIN stored in the master control module 135, and stores the retrieved VIN in memory 128. In one embodiment, the master control module may be a powertrain control module. In another embodiment, the master control module may be a body control module. In yet another embodiment, the master control module may be the telematics unit 120.

In an alternative embodiment, a master control module 135 is configured to request the vehicle identification number from slave modules 136 and 137 when the MVCU 110 is powered-up by an ignition cycle. The phrase "master control module 135" and "electronic module 135" are used interchangeably throughout this document. Also, the phrase "slave modules 136 and 137" and "electronic modules 136 and 137" are used interchangeable throughout this document. The master control module 135 applies an algorithm to determine if the vehicle identification number of the slave modules 136 and 137 matches the vehicle identification number in the master control module 135 prior to allowing operation of the slave modules 136 and 137, respectively. In one embodiment, the master control module 135 is the powertrain control module and the slave module 136 is the radio.

The telematics unit 120 is configured to reprogram the electronic modules 135, 136 and 137 with a new vehicle identification number based on the lock request. If the request includes a request to lock a vehicle function, the telematics unit 120 reprograms the electronic module 135, which is operable to perform the vehicle function, with a vehicle identification number that does not match the vehicle identification number of the MVCU 110. If the request includes a request to unlock a vehicle function, the telematics unit 120 reprograms the electronic module 135, which is operable to perform the vehicle function, with a vehicle identification number that matches the vehicle identification number of the MVCU 110.

During stage S208, the telematics unit 120 locks or unlocks at least one vehicle function based on the modified vehicle identification number and the lock request at the next ignition cycle to power-up the MVCU 110. If the vehicle identification number in the electronic modules 135, 136 and 137 does not match the vehicle identification number in the telematics unit 120, software and hardware embedded in the electronic modules 135, 136 and 137 lock the electronic modules 135, 136 and 137, so the electronic modules 135, 136 and 137 cannot perform the module function.

If the vehicle identification number in the electronic modules 135, 136 and 137 matches the vehicle identification number in the telematics unit 120, software and hardware embedded in the electronic modules 135, 136 and 137 unlock the electronic modules 135, 136 and 137, so the electronic modules 135, 136 and 137 can perform the module function.

Figure 3:
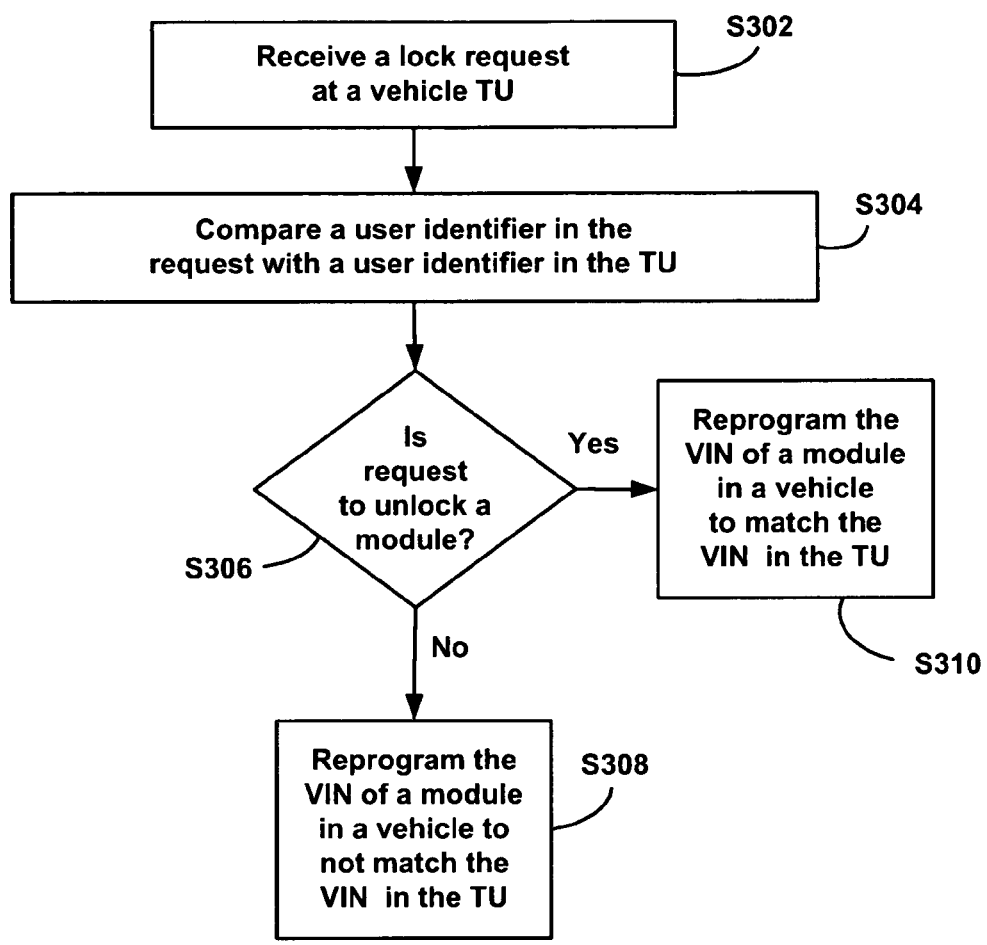
FIG. 3 illustrates a first embodiment of a method for modifying a vehicle identification number to lock or unlock the vehicle function in accordance with the present invention.

FIG. 3 illustrates a first embodiment of a method 300 for modifying a VIN to lock or unlock the vehicle function in accordance with the present invention. In this first embodiment, the telematics unit 120 applies an algorithm to verify the user identification and to determine if the vehicle identification number of the electronic modules 135, 136 and 137 matches the vehicle identification number in the telematics unit 120. The telematics unit 120, the processor 122, in-vehicle memory 128, the key fob (not shown), and the electronic modules 135, 136 and 137 have stored in computer readable medium at least one computer program including computer readable code to perform the operations described with reference to method 300. In one embodiment, the electronic module 135 to be locked or unlocked is the radio unit in the MVCU 110. In another embodiment, the electronic modules 135, 136 and 137 to be locked or unlocked include a plurality of the electronic modules 135, 136 and 137 in the MVCU 110. In yet another embodiment, the electronic modules 135, 136 and 137 to be locked or unlocked include all the electronic modules 135, 136 and 137 in the MVCU 110.

During stage S302, the telematics unit 120 in the MVCU 110 receives a lock request as described above with reference to stage S202 in method 200 of FIG. 2. During stage S304, the telematics unit 120 compares a user identifier in the lock request with a user identifier stored in the in-vehicle memory 128 of the telematics unit 120, as described above with reference to stage S204 in method 200 of FIG. 2.

During stage S306, the telematics unit 120 determines if the lock request received during stage S302 is a request to lock or unlock a vehicle function performed by electronic module 135, 136 or 137. If the request is a lock request, the method 300 proceeds to stage S308.

During stage S308, the telematics unit (TU) 120 reprograms the vehicle identification number (VIN) of electronic module 135, 136 or 137 in an MVCU 110 to not match the vehicle identification number of the telematics unit 120. The processor 122 telematics unit 120 is configured to transmit, via the vehicle communication network 112, the lock command to reprogram the electronic module 135, 136 or 137.

The reprogram command initiates a locking algorithm operable to remove one or more of the digits from the vehicle identification number embedded in the electronic module 135, 136 or 137. In this embodiment, the removed digit or digits are stored in the in-vehicle memory 128. In one embodiment, the reprogram command initiates a locking algorithm operable to add a preset value to the vehicle identification number embedded in the electronic module 135, 136 or 137. Other locking algorithms are possible as is understandable to those of skill in the art.

After the locking algorithm is applied to the electronic module 135, 136 or 137, the next ignition cycle the MVCU 110 renders the electronic module 135, 136 or 137 inoperable. Specifically, during the subsequent ignition cycle, the telematics unit 120 determines the vehicle identification number of the electronic module 135, 136 or 137 does not match the vehicle identification number in the telematics unit 120. The telematics unit 120 then initiates hardware and software in the electronic module 135, 136 or 137 to render the vehicle function inoperable in the electronic module 135, 136 or 137, respectively.

If during stage S306, it is determined that the lock request received during stage S302 is a request to unlock a vehicle function performed by an electronic module 135, 136 or 137, the method 300 proceeds to stage S310. During stage S310, the telematics unit (TU) 120 reprograms the vehicle identification number (VIN) of an electronic module 135, 136 or 137 to match the vehicle identification number of the telematics unit 120. The processor 122 in the telematics unit 120 is configured to request the vehicle identification number from telematics unit 120 when the request to unlock an electronic module 135, 136 or 137 is received at the telematics unit 120. The processor 122 is configured to transmit, via the vehicle communication network 112, the vehicle identification number from telematics unit 120 to the electronic module 135, 136 or 137 with an unlock command to reprogram the electronic module 135, 136 or 137 with the transmitted vehicle identification number.

In one embodiment, the telematics unit 120 had previously responded to a lock request to lock the electronic module 135, 136 or 137. In this case, the processor 122 is configured to transmit, via the vehicle communication network 112, an unlock command to reprogram the electronic module 135, 136 or 137 with the correct vehicle identification number by applying an unlocking algorithm to undo the locking algorithm. For example, if during stage S308, the locking algorithm added a preset amount to the vehicle identification number of the electronic module 135, 136 or 137, then the preset amount is subtracted from the vehicle identification number by the unlocking algorithm during stage S310. If during stage S308, the locking algorithm removed a digit from the vehicle identification number of the electronic module 135, 136 or 137 and stored it in the in-vehicle memory 128, then the removed digit is retrieved from the in-vehicle memory 128 and replaced in the vehicle identification number to form the original correct vehicle identification number during stage S310.

During the next ignition cycle of the MVCU 110, the electronic module 135, 136 or 137 becomes operable, since during that ignition cycle, the telematics unit 120 determines the vehicle identification number of the electronic modules 135, 136 and 137 matches the vehicle identification number in the telematics unit 120.

Figure 4:
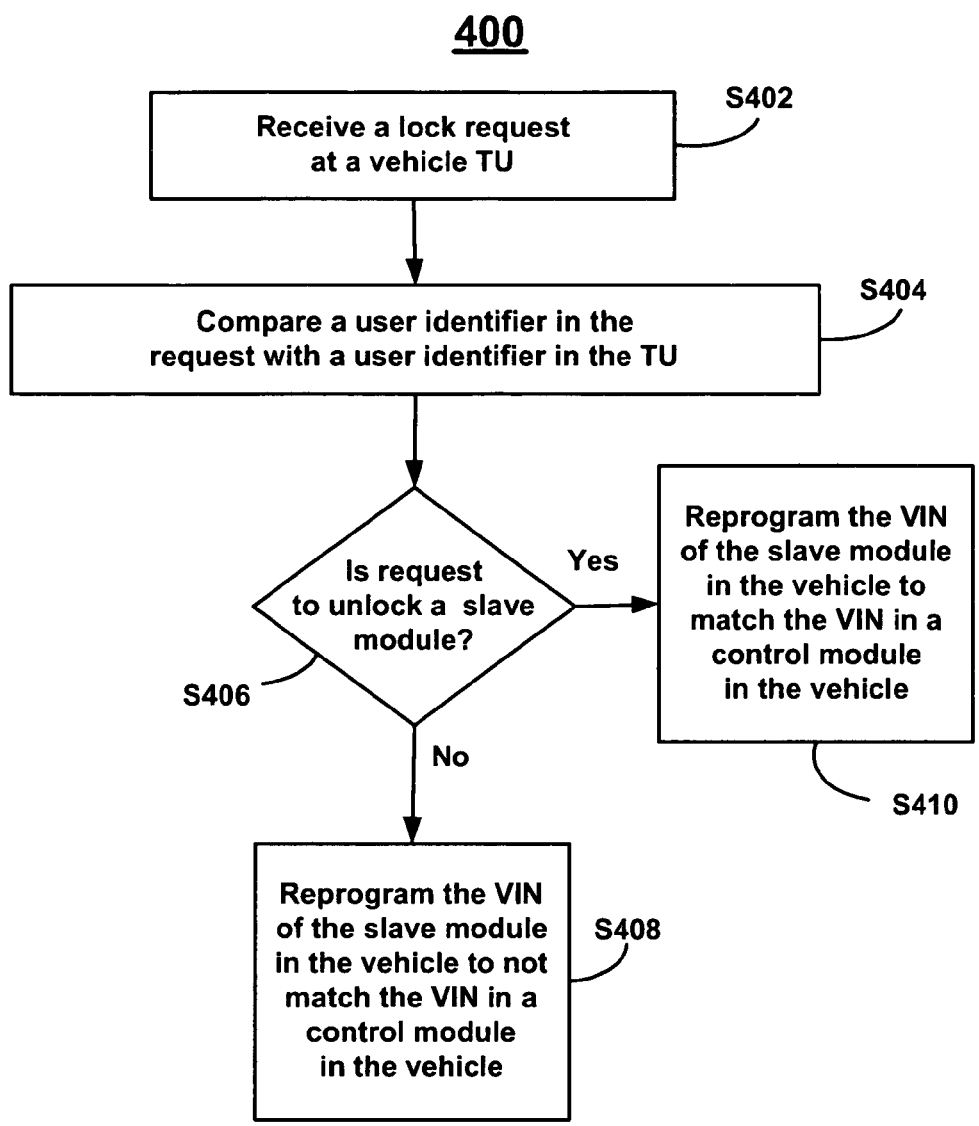
FIG. 4 illustrates a second embodiment of a method for modifying a vehicle identification number to lock or unlock the vehicle function in accordance with the present invention.

FIG. 4 illustrates a second embodiment of a method 400 for modifying a vehicle identification number to lock or unlock the vehicle function in accordance with the present invention. In this second embodiment, the telematics unit 120 applies an algorithm to verify the user identification and to determine if the VIN of the slave electronic modules 136 and 137 matches the vehicle identification number in the master control module 135.

In this embodiment, the telematics unit 120 prompts the master control module 135 to apply the VIN matching algorithm to the slave electronic modules 136 and 137 responsive to receiving a lock request. In this embodiment, the master control module 135 determines if the VIN of the slave electronic modules 136 and 137 match the VIN in the master control module 135 prior to allowing operation of the slave electronic modules 136 and 137.

The telematics unit 120, the processor 122, in-vehicle memory 128, the key fob (not shown), and the electronic modules 135, 136 and 137 have stored in computer readable medium at least one computer program including computer readable code to perform the operations described with reference to method 400. In one embodiment, the master control module 135 is the body control module. In one embodiment, the slave module 136 and 137 to be locked or unlocked is the radio unit in the MVCU 110. In another embodiment, the slave modules 136 and 137 to be locked or unlocked include a plurality of the slave modules 136 and 137 in the MVCU 110. In yet another embodiment, the slave modules 136 and 137 to be locked or unlocked include all the slave modules 136 and 137 in the MVCU 110.

During stage S402, the telematics unit 120 in the MVCU 110 receives a lock request as described above with reference to stage S202 in method 200 of FIG. 2. During stage S404, the telematics unit 120 compares a user identifier in the lock request with a user identifier stored in the in-vehicle memory 128 of the telematics unit 120, as described above with reference to stage S204 in method 200 of FIG. 2.

During stage S406, the telematics unit 120 determines if the lock request received during stage S302 is a request to lock or unlock a vehicle function performed by an electronic module 136 or 137. If the request is a lock request, the method proceeds to stage S408.

During stage S408, the telematics unit (TU) 120 reprograms the vehicle identification number (VIN) of a slave electronic module 136 or 137 to not match the vehicle identification number of the master control module 135. The processor 122 is configured to transmit, via the vehicle communication network 112, a command to reprogram the slave module 136 or 137 with an incorrect transmitted VIN.

The reprogram command initiates a locking algorithm operable to remove one or more of the digits from the VIN embedded in the module 136 or 137. In one embodiment, the reprogram command initiates a locking algorithm operable to add a preset amount to the vehicle identification number embedded in the slave electronic module 136 or 137.

After the locking algorithm is applied to the slave module 136 or 137, the next ignition cycle the MVCU 110 renders the slave module 136 or 137 inoperable. Specifically, during the subsequent ignition cycle, the telematics unit 120 determines the VIN of the slave electronic module 136 or 137 does not match the VIN in the electronic module 135. The telematics unit 120 then initiates hardware and software in the slave module 136 or 137 to render the vehicle function inoperable in the slave electronic module 136 or 137, respectively.

If during stage S406, it is determined that the lock request received during stage S402 is a request to unlock a vehicle function performed by a slave electronic module 136 or 137, the method 400 proceeds to stage S410. During stage S410, the telematics unit (TU) 120 reprograms the VIN of a slave module 136 or 137 to match the VIN of the control electronic module 135. The processor 122 in the telematics unit 120 is configured to request, via the vehicle communication network 112, the VIN from master control module 135 when the request to unlock a slave module 136 or 137 is received at the telematics unit 120. The processor 122 is configured to transmit, via the vehicle communication network 112, the VIN from master control module 135 to the slave module 136 or 137 with an unlock command to reprogram the slave module 136 or 137 with the transmitted VIN.

In one embodiment, if the telematics unit 120 had previously responded to a lock request to lock the slave module 136 or 137. In this case, the processor 122 is configured to transmit, via the vehicle communication network 112, an unlock command to reprogram the slave module 136 or 137 with the correct transmitted vehicle identification number by applying an unlocking algorithm to undo the locking algorithm. For example, if during stage S408, the locking algorithm added a preset amount to the vehicle identification number in the slave module 136 or 137, then the preset amount is subtracted from the vehicle identification number by the unlocking algorithm during stage S310. If during stage S408, the locking algorithm removed a digit from the VIN in the slave module 136 or 137 and stored it in the in-vehicle memory 128, then the removed digit is retrieved from the in-vehicle memory 128 and replaced in the VIN to form the original correct VIN during stage S410.

During the next ignition cycle of the MVCU 110, the slave module 136 or 137 becomes operable, since the telematics unit 120 will determine the VIN of the slave modules 136 and 137 matches the VIN in the telematics unit 120.

While the embodiments, of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method for remotely locking or unlocking vehicle functions, the method comprising:
   receiving a lock request at a vehicle telematics unit;
   modifying a vehicle identification number based on the request; and
   locking or unlocking at least one vehicle function based on the modified vehicle identification number, and the lock request.

2. The method of claim 1, wherein the lock request is one of a request to lock a module or unlock the module, wherein the module is selected from the group consisting of a powertrain control module, an engine control module, a body control module, a radio, an entertainment unit module, an antilock brakes system, an instrument panel cluster, a vehicle ignition module, a remote start key fob, and combinations thereof.

3. The method of claim 1, wherein the request includes a user identifier, the method further comprising:
   comparing the user identifier in the request with a user identifier in the telematics unit,
   wherein modifying a vehicle identification number based on the request is based on the comparison and wherein the user identifier includes one or more of a group consisting of a customer number associated with the vehicle, a password, a security code and a personal identification number.

4. The method of claim 1, wherein modifying a vehicle identification number comprises:
   reprogramming the vehicle identification number of a module in a vehicle to match the vehicle identification number in the telematics unit.

5. The method of claim 1, wherein modifying a vehicle identification number comprises:
   reprogramming the vehicle identification number of a module in a vehicle to not match the vehicle identification number in the telematics unit.

6. The method of claim 1, wherein modifying a vehicle identification number comprises:
   reprogramming the vehicle identification number of a slave module in a vehicle to match the vehicle identification number of a control module in the vehicle.

7. The method of claim 1, wherein modifying a vehicle identification number comprises:
   reprogramming the vehicle identification number of a slave module in a vehicle to not match the vehicle identification number of a control module in the vehicle.

8. The method of claim 1, wherein the request is one of a request to lock a radio and unlock the radio.

9. The method of claim 1, wherein the request is one of a request to lock a plurality of modules and unlock the plurality of modules.

10. The method of claim 1, wherein modifying a vehicle identification number comprises:
    reprogramming the vehicle identification number of a radio in a vehicle to one of matching and not matching the vehicle identification number in the telematics unit.

11. The method of claim 1, wherein modifying a vehicle identification number comprises:
    reprogramming the vehicle identification number of a radio in a vehicle to one of matching and not matching the vehicle identification number of a control module in the vehicle.

12. A computer readable medium storing a computer program comprising:
- computer readable code for receiving a lock request at a vehicle telematics unit;
- computer readable code for modifying a vehicle identification number based on the request; and
- computer readable code for locking or unlocking at least one vehicle function based on the modified vehicle identification number and the lock request.

13. The medium of claim 12, wherein the request includes a user identifier, the medium further comprising:
- computer readable code for comparing the user identifier in the request with a user identifier in the telematics unit.

14. The medium of claim 12, wherein computer readable code for modifying a vehicle identification number comprises:
- computer readable code for reprogramming the vehicle identification number of a module in a vehicle to match the vehicle identification number in the telematics unit.

15. The medium of claim 12, wherein computer readable code for modifying a vehicle identification number comprises:
- computer readable code for reprogramming the vehicle identification number of a module in a vehicle to not match the vehicle identification number in the telematics unit.

16. The medium of claim 12, wherein computer readable code for modifying a vehicle identification number comprises:
- computer readable code for reprogramming the vehicle identification number of a slave module in a vehicle to match the vehicle identification number of a control module in the vehicle.

17. The medium of claim 12, wherein computer readable code for modifying a vehicle identification number comprises:
- computer readable code for reprogramming the vehicle identification number of a slave module in a vehicle to not match the vehicle identification number of a control module in the vehicle.

18. The medium of claim 12, wherein computer readable code for modifying a vehicle identification number comprises:
- computer readable code for reprogramming the vehicle identification number of a radio in a vehicle to one of matching and not matching the vehicle identification number in the telematics unit.

19. The medium of claim 12, wherein computer readable code for modifying a vehicle identification number comprises:
- computer readable code for reprogramming the vehicle identification number of a radio in a vehicle to one of matching and not matching the vehicle identification number of a control module in the vehicle.

20. A system for remotely locking or unlocking vehicle functions, the system comprising:
- means for receiving a lock request at a vehicle telematics unit;
- means for modifying a vehicle identification number based on the request; and
- means for locking or unlocking at least one vehicle function based on the modified vehicle identification number and the lock request.

* * * * *